Patented Oct. 23, 1951

2,572,249

UNITED STATES PATENT OFFICE 2,572,249

ELECTROLYTIC PRODUCTION OF ELEMENTAL BORON

Hugh S. Cooper, Shaker Heights, Ohio, assignor to Walter M. Weil, Cleveland, Ohio No Drawing. Application June 21, 1950,
Serial No. 169,529

21 Claims. (Cl. 204—64)

This invention relates to electro-metallury and particularly to an electrolytic method of producing substantially pure elemental boron and to the resulting product.

The principal object of the invention is to provide a method for producing substantially pure elemental boron on a commercial scale.

Another object of the invention is to provide a method for producing elemental boron in a form which lends itself readily to melting, pressing, and sintering into various shapes and to diverse uses in the metallurgical, chemical, and other industrial arts.

A further object of the invention is to produce elemental boron of sufficient purity to be suitable for direct use in the production of high purity compounds of boron and boron alloys.

A more specific object of the invention is to produce elemental boron in commercial quantities by the electrolysis of boron oxide on a continuous or semi-continuous basis while minimizing contamination of the product by the materials used for the anode and cathode of the electrolytic cell.

This application is a continuation in part of my copending application Serial No. 120,415, filed October 8, 1949, for Production of Boron (now abandoned).

Boron does not exist in a free state in nature. Though practically insoluble in acids and almost as hard as silicon carbide, the free element has been put to no practical use as such prior to the last decade, and is still used only to a very small extent, if at all.

It has previously been discovered that elemental boron has a number of properties that make it potentially of great value in many fields. For example, its exceptionally high specific resistance at room temperature drops rapidly as the temperature increases, a characteristic that lends itself to extensive use in various types of electrical apparatus.

Mere traces of boron in carbon change the temperature coefficient of resistance from negative to positive, giving metal-like electrical characteristics to the carbon.

Boron is a very powerful deoxidizer and has a high affinity for various gases. This makes it highly useful in metallurgical fields, as a degassifying agent in the production of dense castings and the like. Boron is also practically completely insoluble in copper, being quite a unique metal in this respect, and is therefore probably the best agent known for the treatment of molten copper to remove occluded gases therefrom during the making of copper products generally.

Due to their great hardness, free boron metal and boron in the form of alloys and compunds, such as metal borides, should also find many obvious applications in industry when the free metal is available in commercial quantities.

While it is said that boron oxide ($B_2O_3$) may be reduced by heating in the presence of magnesium to produce magnesium oxide and free boron, the process generally carries the boron only to what has been termed a suboxide ($B_7O$). When aluminum is employed in place of magnesium, aluminum boride ($AlB_{12}$) is the result. Boron chloride has been broken down by a high tension arc in the presence of hydrogen to give the pure element but the yields are low and the process is impractical for the production of boron in commercial quantities.

The electrolysis of boron oxide in a fused bath of magnesium oxide and magnesium fluoride has been tried, but bath temperatures of 1100° to 1200° C. were found to be necessary, and metal of only about 92% purity was obtained, probably due in part to the high temperature and to the difficulty of separating the highly insoluble magnesium salts from the product.

Boron is a member of Group III of the periodic table, being grouped with aluminum, lanthanum, yttrium, etc., of which only aluminum is produced or used in commercial quantities. None of the prior art processes for producing any of these other metals in free form is, so far as I am aware, at all useful or practical for producing free boron.

In general, my process involves the electrolysis of a fused bath of potassium chloride or fluoride, potassium fluoborate, and boron oxide ($B_2O_3$). While processes have heretofore been employed to produce so-called refractory metals falling in other groups of the periodic table by electrolysis of their double fluoride salts, their oxides, etc., the same processes, when applied to the electrolysis of similar salts and oxides of boron, have either failed to operate at all for their intended purpose, have yielded a product too impure for practical use, or have involved such serious operating difficulties as to be entirely impractical as commercial processes. Such prior art processes, therefore, instead of pointing the way to the accomplishment of the foregoing objectives, have actually served as misleading sign posts directing the art away from attempts to produce boron by the electrolysis of the aforementioned types of compound.

In accordance with the present invention, I have found that elemental boron in the form of substantially pure fine crystals can be efficiently produced by electrolyzing a fused bath of potassium chloride or fluoride, potassium fluoborate, and boron oxide at temperatures in the range of about 650° to about 1000° C., the boron being deposited on the cathode of the electrolytic cell in its fine granular form, together with predominantly water and acid soluble impurities, and being readily removable from the cathode and purified by washing.

An electrolytic cell for use in the process of this invention may include an externally heated crucible of graphite or similar electrically conductive refractory material protected by an outer shell of a high heat resistant metal, such as the nickel, chromium, and iron alloy marketed under the name Inconel. If desired, heating of the contents of the crucible may be carried out by electrical induction or by electrical resistance heating in the bath itself. The crucible forms the anode of the cell and the alloy shell may be connected to the positive terminal of a source of direct current. Alternatively, the lead from the positive terminal of the source of direct current may be connected directly to the graphite crucible itself. Molybdenum or Inconel sheets or plates are suitable for the cathode when operating on a relatively small scale. However, in large scale operations involving cathode plates ranging upwards in size from 8 inches wide by 16 inches long, with plate thicknesses of ¼ to ½ inch or more, the use of these metals for the cathode presents a number of difficulties.

Molybdenum cathodes, after use in a large cell on a continuous basis for a period of time, become brittle and tend to flake off and contaminate the product. While the molybdenum shows little tendency to combine or alloy with boron, removal of the molybdenum from the product is difficult because of its low solubility in acids. Also it is difficult to obtain molybdenum in large enough sheets of sufficient thickness, and such sheets are unreasonably expensive when obtainable.

Inconel cathodes, when used in large cells on a continuous or semi-continuous basis, have been found to produce excessive nickel contamination of the product, forming acid-insoluble nickel borides that are practically impossible to separate by chemical means from the elemental boron.

While copper cathodes have been used in many electrolytic processes, I have found this metal to be quite unsuitable for use in carrying out the process of the present invention. The surface oxidation of copper has a tendency to contaminate the bath or the product unduly and tends to peel off with the product when the cathodes are stripped.

In an effort to find a satisfactory cathode material, low carbon iron was tried in spite of its reactivity and alloying characteristics. When cathodes of this material were removed from the cell and quickly coated with salt and allowed to cool, the bulk of the boron deposit was found to strip off easily when tapped with a hammer, but a thin adherent coating of boron was found to remain. By leaving this thin coating on the iron cathode, instead of trying to scrape off all of the boron according to prior practice, it was found that iron contamination stayed surprisingly low, generally being well below 0.5%. This amount of iron may be largely removed by an acid wash and presents no significant problem, whereas the contamination resulting from the use of cathodes of molybdenum or Inconel is not removable by any commercially practical process.

Further advantages of low carbon iron cathodes are their excellent resistance to warping, low cost, and availability in any desired sizes and shapes.

A particularly suitable iron for the cathode, which is available commercially, is "Armco Iron". This product contains approximately 0.12% carbon, 0.017% manganese, 0.005% phosphorous, 0.025% silicon, and the balance iron. However, any low carbon and low alloy iron may be employed. The carbon is preferably kept close to or below 0.1%, as higher carbon contents appear to promote objectionable warping of thin cathode plates.

For a more complete understanding of the present invention and the effects of varying the raw materials, operating conditions, and types of apparatus employed, reference will be made to a number of specific examples. However, it is to be understood that these examples have been selected merely for illustrative purposes, and that the details thereof may be changed in many particulars as indicated in the accompanying discussion.

*Example 1*

4000 grams of potassium chloride and 1500 grams of potassum fluoborate were melted together in a graphite crucible of the type described above, measuring 6 inches inside diameter and 8 inches in depth, and the melt was brought to a temperature around 800° C. To this fused bath was added 500 grams of boron oxide ($B_2O_3$), which quickly dissolved in the bath. A sheet molybdenum cathode about 3¼ inches wide, 7 inches long, and 0.1 inch thick was then lowered and completely immersed in the bath, and the current was turned on to place the cell in operation. The voltage ranged from 6.3 to 7.8 volts with an average current of about 580 amperes that remained substantially constant throughout the run.

During the operation of the cell, elemental boron was deposited on the cathode, and oxygen was released at the anode. A thick black scum formed over the surface of the bath, but the amount of the scum was small, and no effort was made to identify it or remove it. Electrolysis was continued without interruption for about 2½ hours, after which the current was shut off, and the cathode was withdrawn and quickly covered with dry sodium chloride to protect the boron deposit from oxidation. When the cathode had cooled to below a visible red glow of the material clinging thereto, the cathode was immersed in water for a period of several hours, during which time most of the deposit had fallen off and the remainder was readily scraped off. Upon prolonged digestion of the removed deposit with water, and then with strong hydrochloric acid, the residue was finally washed with water, dried, and sifted for size classification.

The product was in the form of fine crystals, about 90% of which passed through a 325 mesh sieve. Chemical analysis of this product showed its composition to be approximately as follows:

| | Percent |
|---|---|
| Boron | 98.68 |
| Iron | 0.22 |
| Silicon | 0.38 |
| Carbon | 0.45 |
| Molybdenum | 0.27 |
| | 100.00 |

118 grams of the final product were recovered. Calculated on the basis of 1% of moisture in the 500 grams of boron oxide initially charged into the crucible, and on the basis of 98.68% of the product being pure boron, the final yield represented about 78% of the amount of boron in the initial charge. Since the run was carried out on a batch basis with electrolysis being stopped before detecting any evolution of chlorine, which would indicate complete exhaustion of the boron oxide, the recovery potentialities of the process when operated on a continuous basis were demonstrated to be unusually high.

Upon attempting to apply the above described process to large electrolytic cells, and particularly when operating on a continuous basis, I then discovered that the purity of the boron drops substantially and that the carbon content may remain as high as 3 or 4% even after thorough washing. This is objectionable for many of the metallurgical uses for elemental boron, and is especially so when using the boron to produce metal borides or for various purposes in atomic energy and radio activity projects. Since the carbon is insoluble in all reagents, its satisfactory removal from the product is practically impossible. Thus, in the many instances in which carbon impurities are detrimental, mere enlargement of the scale upon which Example 1 was performed is not entirely satisfactory, particularly when operating on a continuous basis. Commercial use of the process, as described in Example 1, therefore, should preferably be confined to relatively small equipment and batch operation.

As noted in the foregoing example, a black scum was observed on the surface of the bath during the electrolysis. When employing a larger cell on a continuous basis, this scum accummulated in somewhat greater amounts. Examination of the scum in later work disclosed that it consisted largely of finely divided carbon, presumably produced by the erosive action of the hot bath on the graphite crucible, the bath being kept in a constant state of agitation by the high current passing therethrough. Surprisingly, when this scum was removed at frequent intervals during the electrolysis, so that its quantity was prevented from building up, the carbon contamination problem was substantially eliminated. In fact, the amount of carbon in the product was readily held well below 0.50 per cent while operating continuously, and was frequently reduced to about 0.15 per cent. More thorough washing sometimes helps in still further reducing the carbon content of the product.

To illustrate the results obtained by employing the skimming step, reference is made to the following two comparative examples in which the equipment was basically the same as that employed in Example 1, though substantially larger in size.

*Example 2*

The crucible employed in this example was generally cylindrical in form and was lined on the sides and the bottom with approximately three inches of graphite. The interior diameter of the crucible was 10 inches and its vertical height was 13½ inches. The cathode employed was made of iron and was $\tfrac{1}{16}$ inch thick, 5½ inches wide, and 9 inches long.

14 kilograms of potassium chloride and 4.5 kilograms of potassium fluoborate were melted together in the crucible and brought to a temperature of about 850° C. To this fused bath was added 1.5 kilograms of boron oxide. The current was then applied and electrolysis was continued for 8½ hours with an average voltage of about 6.0 and an average amperage of about 500. The black scum appeared as before, but it was allowed to accumulate without being removed.

At the end of the electrolysis period the cathode was removed, quickly covered with dry sodium chloride, and, after cooling, the cathode deposit was removed and purified as in Example 1. This purified product amounted to 440 grams, which was sifted to give 45 grams of material passing a 40 mesh screen and held on a 100 mesh screen, 50 grams of material passing a 100 mesh screen and held on a 200 mesh screen, and 345 grams of material finer than 200 mesh. Upon separate analysis of these three components, the coarse material was found to be only about 81% boron and nearly 5% carbon and was discarded as commercially unusable. The other two components gave the following analyses:

| 100–200 mesh | Per cent | −200 mesh | Per cent |
|---|---|---|---|
| Boron | 93.60 | Boron | 96.90 |
| Iron | 0.58 | Iron | 0.66 |
| Carbon | 4.33 | Carbon | 0.97 |
| Undetermined | 1.49 | Undetermined | 1.47 |
| | 100.00 | | 100.00 |

The combination of these last two components represented a boron yield of about 85%, in the form of material containing about 96% boron and about 1.4% carbon.

*Example 3*

In this example, the same equipment and the same bath ingredients and procedure were employed as in Example 2, except that the black carbon scum was skimmed from the surface of the bath every ten or fifteen minutes during the electrolysis. 390 grams of product were recovered in five hours of operation, representing about 86% recovery based on the amount of boron in the boron oxide charge material. Of the 390 grams of product, 335 grams passed through a 325 mesh sieve and the remainder was made up of particles held on a 40 mesh sieve. Analysis of the product indicated the following average composition:

| | Per cent |
|---|---|
| Boron | 99.50 |
| Iron | 0.28 |
| Carbon | 0.16 |
| Undetermined | 0.06 |
| | 100.00 |

By a comparison of the carbon contents of the products of Examples 2 and 3, the importance of skimming the black scum from the surface of the bath is strikingly apparent.

While the foregoing run was made with a single cathode, it will be apparent that the improvements demonstrated thereby render the process suitable for multiple cathode operations in still larger cells.

The foregoing examples have all involved the use of potassium chloride as the bath solvent for the potassium fluoborate. To illustrate the use of potassium fluoride in place of potassium chloride, the following example is given in which the process was carried out in the same apparatus employed in Examples 2 and 3.

*Example 4*

5500 grams of potassium fluoride and 2000 grams of potassium fluoborate were melted together in the crucible and brought to a temperature of about 900° C. To this fused bath was added 500 grams of boron oxide, which quickly dissolved in the bath. An iron cathode about 3¼ inches wide, 7 inches long, and 0.1 inch thick was immersed in the bath and the current was turned on. The voltage remained close to 6.75 volts and averaged about 725 amperes with very little fluctuation, thus indicating little or no anode effect in spite of the high fluoride content of the bath. As in the previous examples, a small quantity of black scum was observed to accumulate on the surface of the bath and was removed every ten to fifteen minutes. Electrolysis was continued for 2 hours.

About 105 grams of product was recovered from the washing operations and sifted for size grading, the sifted material being about half larger and half smaller than 40 mesh, with little or none of the very fine material of Examples 1, 2, and 3. The finer and coarser portions of the product were separately analyzed with the following results:

| Fine material | Per cent | Coarse material | Per cent |
|---|---|---|---|
| Boron | 94.1 | Boron | 96.7 |
| Iron | 0.8 | Iron | 1.0 |
| Carbon | 1.2 | Carbon | 0.6 |
| Undetermined | 3.9 | Undetermined | 1.7 |
| | 100.00 | | 100.00 |

The total boron recovery was approximately 67%. Though the purity was not as high as in the preceding example in which potassium chloride was employed as the main bath solvent, rather than potassium fluoride, the difference is partly attributable to greater impurities in the potassium fluoride used. However, the lower purity may also have been due in part to the combined effects of the higher bath temperature that had to be employed to melt the potassium fluoride (m. p. about 800° C.), the higher current density, and the consequently greater erosive activity of the bath. The most striking difference in the product resulting from the substitution of potassium fluoride for potassium chloride was the great increase in the particle size of the product.

Examples 1 to 4 were all carried out strictly on a batch basis to establish the general operative character of the process and the preferred procedures for obtaining a high purity product. While the yields were calculated and noted with interest, no particular effort was made to obtain the maximum yield of product per gram of $B_2O_3$ charged material. If batch operation on a commercial basis were to be practiced, it would obviously be desirable to modify the foregoing examples in one of two ways to obtain optimum yields per gram of boron containing bath ingredients. One modification would be to reuse the bath materials remaining at the end of one batch operation in a second batch operation by adding a new charge of $B_2O_3$, which would be practically the same as operating on a continuous basis as far as the ultimate boron yield and cost of bath solvent materials are concerned. The other modification would be to continue the electrolysis after the $B_2O_3$ is exhausted, in which case the potassium fluoborate in the bath would be consumed to deposit boron at the cathode, produce additional potassium fluoride in the bath, and release chlorine at the cathode, all in accordance with my prior copending application, Serial No. 120,414, filed October 8, 1949.

In that prior application I disclosed and claimed a process for producing boron by the electrolysis of a fused bath of potassium chloride and potassium fluoborate in which the fluoborate constitutes the source of boron, and chlorine is released at the anode as a result of decomposition of the potassium chloride. The potassium from the potassium chloride decomposition combines with the available fluorine from the potassium fluoborate to produce potassium fluoride in the bath at a rate several times equivalent to the amount of chlorine and boron released at the anode and cathode respectively. Continuation of the process of the present application after exhaustion of the $B_2O_3$ merely results in consuming the $KBF_4$ of the bath in accordance with my copending application, Serial No. 120,414. The boron so produced from $KBF_4$ tends toward larger particle sizes, but such larger particles are readily separated from the smaller particles by screening, which is usually practiced regardless of the percentage of large particle sizes present in the product. Moreover, it appears that particle size may be controlled by proper adjustment of the electrolysis process.

This last described continuation of a batch process is practical only when potassium chloride is used as the solvent for the potassium fluoborate. When potassium fluoride is substituted, continued electrolysis after exhaustion of the $B_2O_3$ releases fluorine at the anode, and this causes a number of complications, including pronounced anode effects.

To illustrate the application of the present invention to continuous operation in still larger equipment, the following example is given:

*Example 5*

The crucible employed in this example was generally cylindrical in form and lined on the sides and bottom with approximately three inches of graphite. The interior diameter of the crucible was 16 inches and its vertical height was 30 inches. The cathode employed was Armco iron ½ inch thick, 8 inches wide, and 16 inches long, the cathode plate being suspended from a copper rod having a slotted lower end with the plate disposed in the slot and bolted in place. The rod was made of copper to minimize electrical losses therein resulting from the resistance of the rod and the high current employed. To prevent overheating of the rod, which promotes surface oxidation thereof and the likelihood of contamination of the bath with copper oxide, the rod was made hollow, and cooling water was introduced through a small diameter tube disposed in the hollow copper rod with its open end adjacent the bottom thereof. Thus, water issuing from the lower end of the tube flowed upwardly around the tube and was piped off at the upper end of the hollow rod.

The crucible was heated by gas burners for initially melting the solvent components of the bath. 225 lbs. of potassium chloride and 75 lbs. of potassium fluoborate were melted in the crucible, and the bath was brought to a temperature of about 860° C. by means of the gas burners. With the current turned on, boron oxide was added at fifteen minute intervals in amounts of 4 lbs. at a time until 12 lbs. had been added. Thereafter, additional boron oxide was supplied at intervals of a half hour or so in 4 lb. increments throughout the run.

Every three to four hours, the cathode was removed for recovery of boron, the cathode being quickly coated with sodium chloride upon withdrawal from the bath. Removal of the deposit from the cathode was carried out, as described above, so as to leave a thin, adherent coating of iron boride, and the same cathode was thereafter reinserted for continuing the process. Additional potassium chloride and potassium fluoborate, in the initial ratio of 3 to 1, were also added at about three to four hour intervals to make up for the small amounts lost by vaporization and the considerably larger amounts entrained with the cathode deposit and lost from the bath when the cathode was withdrawn for recovery of boron therefrom. The total potassium chloride added during the run was 135 lbs. and the total potassium fluoborate added was 75 lbs.

The run was continued for about 72 hours, exclusive of interruptions for removing the cathode deposits, during which time the current was maintained very uniformly at 2500 amperes with the voltage varying slightly between 7 and 8 volts. Then, before concluding the run, the current was raised to 4000 amperes at 10 volts for 2½ hours to clean up the available boron in the bath as completely as possible. The bath was skimmed about every 15 to 20 minutes throughout the run.

The total amount of boron oxide used during the run was 142 lbs., of which about 42.6 lbs. was boron. The cathode deposits were washed with water and acid in the usual manner, and the thus purified product amounted to 38.4 lbs., or about 88% recovery of the boron in the boron oxide charge material. The current efficiency for the entire run was extraordinarily high, being about 98%.

Because of the large amount of the product, it was purified and analyzed in 14 separate batches as they were removed from the cathode. The purity of the boron in these batches varied somewhat, ranging from about 90% to better than 99.5%, with more than half of the material analyzing better than 98% boron and only about 0.40% iron and 0.25% carbon. The boron purity of the material from the fourteen separate analyses is summarized in the following table:

| Pounds of product | Per cent boron |
|---|---|
| 10.7 | 99 |
| 9.9 | 98 |
| 7.0 | 97 |
| 9.8 | 96 |
| .6 | 95 |
| 2.4 | 95 |
| 38.4 | |

The batches of highest boron purity were, of course, also lowest in carbon and iron impurities.

It will be apparent from Example 5 that the process as disclosed therein is admirably adapted for continuous operation in still larger cells capable of receiving several cathode plates at a time. In such a case, the cathode plates would preferably be removed one at a time for recovery of boron, and a replacement cathode would be immediately or simultaneously inserted in the bath. This operation could be mechanically performed with a variety of mechanical devices for suspending the cathodes, as will be readily appreciated by those skilled in the art.

By contrast with the process of my above mentioned copending application, Serial No. 120,414, in which $KBF_4$ is employed as the source of boron and chlorine is evolved at the anode, the present process employs boron oxide as the source of boron and oxygen, rather than chlorine, is released at the anode. While I do not wish to be limited by any theory of operation, it appears that the potassium fluoborate is dissolved in the potassium chloride or potassium fluoride and that the boron oxide is in turn dissolved in the potassium fluoborate. The alkali compounds are apparently not disassociated by the current, as only boron oxide appears to be consumed.

While the potassium chloride or fluoride and potassium fluoborate in the present process remain in the bath unchanged, apparently acting only as electrically conductive inert vehicles, their presence is essential for that purpose. Without the potassium chloride or fluoride, the potassium fluoborate would undergo slow thermal decomposition at the bath temperatures and would become viscous and gummy in the presence of boron oxide alone. Without the potassium fluoborate, the bath is very gummy and unmanageable, and no product is obtained.

The proportions of potassium chloride or fluoride, potassium fluoborate, and boron oxide employed in the foregoing examples are in no wise critical, and substantial variation from these proportions is permissible, so long as the bath remains homogeneous. Since the potassium fluoborate is protected from thermal decomposition by being dissolved in the potassium chloride or fluoride, it is necessary that the amount of potassium chloride or fluoride be sufficient for that purpose. In addition, the viscosity of the bath is affected by the proportions of these two ingredients. By keeping the amount of fluoborate less than the amount of the chloride or fluoride, the first condition is more than satisfied and the bath will have the preferred degree of fluidity.

The amount of boron oxide is limited by the amount that will easily dissolve in the bath, and this is largely dependent upon the amount of the fluoborate, which acts as the solvent for the boron oxide. The electrical efficiency of the process is not noticeably affected until the boron oxide is nearly consumed. So long as an appreciable quantity of boron oxide is present, any amount up to the limit of its solubility in the bath may be employed initially, and additions need only be made sufficiently often to keep the amount of boron oxide within the widely separated limits indicated.

In the process of my copending application, Serial No. 120,414, the boron deposited on the cathode is a coarse crystalline aggregate having a purity of about 99.5%. In the process of the present application, the boron is formed as crystals of considerably smaller particle size and about the same purity. If the boron oxide in the bath of the present invention is not replenished before it becomes exhausted, continuation of the electrolysis results in the deposit of boron from the potassium fluoborate in accordance with the process of my copending application, as explained above. Because this tends to produce boron crystals of considerably larger size than those resulting from the electrolysis of the boron oxide, it may be desirable that the boron oxide in the bath not be permitted to become exhausted if only the small particle size product is desired. Also, if potassium fluoride is employed in place of potassium chloride in the present invention, a much coarser product is obtained. However, as previously indicated, further experimentation with different rates of deposition, cell sizes, cathode to anode surface ratios, and bath compositions may give some measure of control of particle size in both the present oxide process and the $KBF_4$ process of my application Serial No. 120,414.

The process of the present invention is preferable from the standpoint of the cost and availability of the material used as a source of boron and also from the standpoint of power consumption, the latter advantage resulting from the lower resistance of the bath in the process of the present invention. Also the maximum current that can be passed through the bath of this process with optimum yield per ampere, is from 50% to 100% greater for a given cell than when the bath of the process of my copending application is employed, thus giving a far greater production rate.

From the standpoint of the quality of the resulting product, the process of the above mentioned copending application may be preferable for cerain uses because of the larger particle size of the product. In other instances, the fine particle size material is preferred. The choice between the two processes, therefore, is dependent primarily upon the uses to which the product is to be put.

In the foregoing specification my invention has been illustrated by reference to several specific examples, and certain variations thereof that may be followed in practice have been mentioned in more or less detail. It will be appreciated, however, that still other variations of details of the process will occur to those skilled in the art and may be practiced without departing from the true spirit and scope of the invention as defined in the appended claims.

In the claims, the expression "normally gaseous halogen" is employed to designate chlorine and fluorine, which are the only halogens that are gases at normal temperature and pressure.

Having disclosed my invention in detail, I claim:

1. The process of preparing boron comprising electrolyzing a fused bath consisting essentially of a potassium salt of a normally gaseous halogen, potassium fluoborate, and boron oxide.

2. The process of preparing boron comprising electrolyzing a fused bath consisting essentially of a potassium salt of a normally gaseous halogen, potassium fluoborate, and boron oxide in an electrolytic cell, and removing the cathode of the electrolytic cell for recovery of boron deposited thereon.

3. The process of preparing boron comprising preparing a fused mixture consisting essentially of a potassium salt of a normally gaseous halogen, potassium fluoborate, and boron oxide, and electrolyzing said mixture in an electrolytic cell to deposit boron on the cathode, the amount of said potassium salt being sufficient to dissolve the potassium fluoborate and maintain the bath in a fluid state.

4. The process of preparing boron comprising preparing a fused mixture consisting essentially of a potassium salt of a normally gaseous halogen, potassium fluoborate, and boron oxide, electrolyzing said mixture in an electrolytic cell having an iron cathode.

5. The process of preparing boron comprising preparing a fused mixture consisting essentially of potassium chloride, potassium fluoborate, and boron oxide, electrolyzing said mixture in an electrolytic cell while maintaining the mixture in the range of about 650° to about 1000° C., and removing the cathode of the electrolytic cell for recovery of boron deposited thereon.

6. The process of preparing boron comprising preparing a fused mixture consisting essentially of potassium fluoride, potassium fluoborate, and boron oxide, electrolyzing said mixture in an electrolytic cell while maintaining the mixture in the range of about 800° to about 1000° C., and removing the cathode of the electrolytic cell for recovery of boron deposited thereon.

7. The process of preparing boron comprising preparing a fused mixture consisting essentially of potassium chloride, potassium fluoborate, and boron oxide, electrolyzing said mixture in an electrolytic cell while maintaining the mixture in the range from about 650° to about 1000° C., adding boron oxide to the mixture in the course of the process to replace that consumed during the electrolysis, and recovering boron from the cathode.

8. The process of preparing boron comprising preparing a fused mixture consisting essentially of potassium fluoride, potassium fluoborate, and boron oxide, electrolyzing said mixture in an electrolytic cell while maintaining the mixture in the range from about 800° to about 1000° C., adding boron oxide to the mixture in the course of the process to replace that consumed during the electrolysis, and recovering boron from the cathode.

9. The process of preparing boron comprising preparing a fused mixture consisting essentially of potassium chloride, potassium fluoborate, and boron oxide, electrolyzing said mixture in an electrolytic cell to deposit boron on the cathode while maintaining the mixture in the range from about 650° to about 1000° C., adding boron oxide to the mixture during the course of the electrolysis to replace that consumed by decomposition, recovering boron from the cathode, and purifying the recovered boron by washing with water and acid.

10. The process of preparing boron comprising preparing a fused mixture consisting essentially of potassium fluoride, potassium fluoborate, and boron oxide, electrolyzing said mixture in an electrolytic cell to deposit boron on the cathode while maintaining the mixture in the range from about 800° to about 1000° C., adding boron oxide to the mixture during the course of the electrolysis to replace that consumed by decomposition, recovering boron from the cathode, and purifying the recovered boron by washing with water and acid.

11. The process of preparing boron comprising preparing a fused mixture consisting essentially of potassium chloride, potassium fluoborate, and boron oxide, the amount of potassium chloride being at least as great as the amount of potassium fluoborate, and the amount of potassium fluoborate being sufficient to dissolve the boron oxide, electrolyzing said mixture in an electrolytic cell to deposit boron on the cathode, and removing the cathode from the cell for recovery of boron deposit thereon.

12. The process of preparing boron comprising preparing a fused mixture consisting essentially of potassium fluoride, potassium fluoborate, and boron oxide, the amount of potassium fluoride being at least as great as the amount of potassium fluoborate, and the amount of potassium fluoborate being sufficient to dissolve the boron oxide, electrolyzing said mixture in an electrolytic cell to deposit boron on the cathode, and removing the cathode from the cell for recovery of boron deposit thereon.

13. The continuous process of preparing boron comprising preparing a fused mixture consisting essentially of potassium chloride, potassium fluoborate, and boron oxide, the amount of potassium chloride being at least as great as the amount of potassium fluoborate, and the amount of potassium fluoborate being sufficient to dissolve the boron oxide, electrolyzing said mixture in an electrolytic cell having a removable iron cathode to deposit boron on the cathode while adding boron oxide periodically to replace that consumed by electrolysis, and removing the cathode from the cell from time to time for recovery of boron therefrom, the recovery of boron from the cathode being performed so as to leave an adherent coating of boron substantially completely covering and protecting the surface of that part of the cathode immersed in the fused bath.

14. The continuous process of preparing boron comprising preparing a fused mixture consisting essentially of potassium fluoride, potassium fluoborate, and boron oxide, the amount of potassium fluoride being at least as great as the amount of potassium fluoborate, and the amount of potassium fluoborate being sufficient to dissolve the boron oxide, electrolyzing said mixture in an electrolytic cell having a removable iron cathode to deposit boron on the cathode while adding boron oxide periodically to replace that consumed by electrolysis, and removing the cathode from the cell from time to time for recovery of boron therefrom, the recovery of boron from the cathode being performed so as to leave an adherent coating of boron substantially completely covering and protecting the surface of that part of the cathode immersed in the fused bath.

15. In the process of preparing boron in a carbon lined electrolytic cell by electrolyzing a fused mixture consisting essentially of a potassium salt of a normally gaseous halogen, potassium fluoborate, and boron oxide, the step which comprises skimming carbon containing impurities from the surface of said fused mixture periodically during the process to reduce the carbon content of boron deposited on the cathode.

16. In the process of preparing boron in a carbon lined electrolytic cell by electrolyzing, at a temperature in the range of 650° to 1000° C., a fused mixture consisting essentially of potassium chloride, potassium fluoborate, and boron oxide, the improvement which comprises skimming carbon containing impurities from the surface of said fused mixture periodically during the process to reduce the carbon content of boron deposited in the cathode.

17. In the process of preparing boron in a carbon lined electrolytic cell by electrolyzing, at a temperature in the range of 800° to 1000° C., a fused mixture consisting essentially of potassium fluoride, potassium fluoborate, and boron oxide, the improvement which comprises skimming carbon containing impurities from the surface of said fused mixture periodically during the process to reduce the carbon content of boron deposited in the cathode.

18. In the process of preparing boron in a carbon lined electrolytic cell by electrolyzing, at a temperature in the range of 650° to 1000° C., a fused mixture consisting essentially of potassium chloride, potassium fluoborate, and boron oxide, while adding boron periodically during the process to replace that consumed during the electrolysis, the improvement which comprises skimming carbon containing impurities from the surface of said fused mixture periodically during the process to reduce the carbon content of boron deposited on the cathode.

19. In the process of preparing boron in a carbon lined electrolytic cell by electrolyzing, at a temperature in the range of 800° to 1000° C., a a fused mixture consisting essentially of potassium fluoride, potassium fluoborate, and boron oxide, while adding boron periodically during the process to replace that consumed during the electrolysis, the improvement which comprises skimming carbon containing impurities from the surface of said fused mixture periodically during the process to reduce the carbon content of boron deposited on the cathode.

20. The process of producing elemental boron of high purity which comprises electrolyzing, at a temperature in the range of 650° to 1000° C., a a carbon lined electrolytic cell having an iron cathode removably suspended therein, a fused mixture consisting essentially of potassium chloride, potassium fluoborate, and boron oxide, periodically skimming carbon containing impurities from the surface of the bath during the period of electrolysis, and periodically withdrawing the cathode and removing therefrom the major portion of boron deposited thereon while leaving an adherent coating of boron over substantially the entire surface of the cathode upon which boron was deposited.

21. The process of producing elemental boron of high purity which comprises electrolyzing, at a temperature in the range of 800° to 1000° C., a a carbon lined electrolytic cell having an iron cathode removably suspended therein, a fused mixture consisting essentially of potassium fluoride, potassium fluoborate, and boron oxide, periodically skimming carbon containing impurities from the surface of the bath during the period of electrolysis, and periodically withdrawing the cathode and removing therefrom the major portion of the boron deposited thereon while leaving an adherent coating of boron over substantially the entire surface of the cathode upon which boron was deposited.

HUGH S. COOPER.

REFERENCES CITED

The following references are of record in the file of this patent:

"Transactions of The American Electrochemical Society," vol. 47 (1925), pages 28 thru 33.

Certificate of Correction

Patent No. 2,572,249 October 23, 1951

HUGH S. COOPER

It is hereby certified that error appears in the printed specification of the above numbered patent requiring correction as follows:

Column 14, line 16, before "fused" strike out "a"; lines 27 and 42, for "1000° C., a" read *1000° C., in*;

and that the said Letters Patent should be read as corrected above, so that the same may conform to the record of the case in the Patent Office.

Signed and sealed this 12th day of February, A. D. 1952.

[SEAL]

THOMAS F. MURPHY,
*Assistant Commissioner of Patents.*